UNITED STATES PATENT OFFICE 1,965,061

VEGETABLE TANNING MATERIAL OR EXTRACT

Andrew Turnbull and Frederick Benjamin Hobson, Harpenden, England, assignors to The Forestal Land, Timber & Railways Company Limited, London, England, a company of Great Britain No Drawing. Application May 13, 1933, Serial No. 670,991. In Great Britain May 25, 1932

15 Claims. (Cl. 149—4)

This invention relates to vegetable tanning materials or extracts and is concerned with the decolourization of such materials. Many vegetable tanning materials are naturally rather highly coloured with the result that leathers tanned by them may be undesirably dark coloured, and the object of the present invention is to provide an improved method of decolourizing such tanning materials or extracts and thus of improving the quality of the leather which is tanned by them.

In the improved method according to this invention vegetable tanning materials are treated with formic acid and/or salts of formic acid in an aqueous solution containing sulphurous acid and/or salts of that acid. Conveniently the tanning material, in the form of a concentrated extract, is heated in water so as to form a homogeneous liquid, sulphurous acid and/or its salts are added to the hot liquid and then formic acid or a salt of formic acid is added preferably in several instalments separated by appreciable time intervals.

The use of sulphurous acid and/or its salts for decolourizing tanning extracts is well known, but by the addition of formic acid or its salts in accordance with this invention the colour of the liquor is very greatly reduced owing to the formic acid reacting with the sulphurous acid, bisulphite or sulphite as a powerful reducing agent with the evolution of carbonic acid gas. The reaction which causes this decolourization apparently begins at a temperature of about 75° C. and becomes very energetic at about 95° C. but satisfactory results can be obtained in a suitable vessel when the temperature is slightly higher than 100° C. say 103° C. In the presence of the formic acid the temperature of the liquor may therefore be maintained at between 75° C. and 100° C., the best results usually being obtained when the temperature is between 90° and 95° C.

The amount of formic acid or its salts which is added to the hot liquid containing sulphurous acid or its salts, is preferably less than 2% of the weight of the tanning material or extract although in certain cases slightly greater amounts of formic acid may be employed.

It is believed that the success of the improved method of this invention is due to the aldehydic nature of formic acid, the aldehyde being oxidized to form carbonic acid but it is unlikely that the reaction is as simple as this and probably intermediate sulphur compounds are formed. In any case it is not desired to be committed to any theory but to rely upon the improved results obtained by the use of formic acid in the manner described.

The following is a description by way of example of the application of the improved method according to this invention to the decolourization of several varieties of tanning extracts.

Example I 50 kilograms of ordinary solid quebracho extract are made into a homogeneous liquid by heating with 45 litres of water. Sufficient liquid bisulphite of soda for the pure salt to be equivalent to 7% of the weight of the solid extract is stirred into the liquor and the temperature is raised to 95° C. The liquor is maintained at this temperature and stirred constantly whilst formic acid, equivalent in pure formic acid to 1.43%, in this specific case, of the weight of the solid extract, is added in six equal installments during a period of twelve hours. The temperature is maintained and the stirring continued for a further period of four hours, sufficient water being added to bring the weight of the liquid product up to 100 kilograms.

This extract shows a standard Lovibond tintometer colour-measurement of red 1.5 and yellow 2.3, whereas the applicants have found that the same extract treated in a similar manner but without the addition of formic acid shows red 3.2 and yellow 4.1.

Example II 50 kilograms of ordinary solid quebracho extract are made into a homogeneous liquid by heating with 45 litres of water. Sufficient liquid bisulphite of soda for the pure salt to be equivalent to 6% of the weight of the solid extract, together with an amount of anhydrous sodium formate equivalent to 0.6% of the weight of the solid extract, are stirred into the liquor and the temperature is raised to 98° C. The liquor is maintained at this temperature and constantly stirred for 16 hours. It is then soluble in cold water and, after cooling, sufficient water is added to bring the weight of the liquid product up to 100 kilograms.

This extract shows a standard Lovibond tintometer colour-measurement of red 2.4 and yellow 3.6 whereas the applicants have found that the same extract treated in a similar manner but without the addition of sodium formate shows red 3.2 and yellow 4.1.

Example III 50 kilograms of ordinary solid quebracho extract are made into a homogeneous liquid by heating with 45 litres of water. The liquor is maintained at a temperature of 40° C. and constantly stirred whilst sulphurous acid gas equal in weight to 2% of the weight of the solid extract is passed into it. The temperature is then raised slowly to 90° C. and maintained at this value whilst the liquor is stirred constantly and formic acid, equivalent in pure formic acid to ¾% of the weight of the solid extract, is added in six equal instalments spread over a period of three hours. Half an hour after the last addition of formic acid the temperature of the liquor is raised to 95° C. and this temperature is then maintained for half an hour, sufficient water being added to bring the weight of the liquid product to 100 kilograms.

This extract, which is not completely soluble on analysis, shows a standard Lovibond tintometer colour-measurement of red 1.1 and yellow 2.4 whereas an aqueous extract made with the same ordinary solid quebracho extract and treated with sulphurous acid in the same way but without formic acid, shows red 2.1 and yellow 3.2.

The so-called total Lovibond tintometer colour of tannning extracts can usually be determined by dissolving them in a certain proportion of alcohol or acetone. The respective extracts given in this example show a total Lovibond tintometer colour in the case of the one treated in accordance with this invention of red 2.4, yellow 3.1, whereas in the other case when the extract is treated with sulphurous acid in the same way but without formic acid the total Lovibond tintometer colour is red 4.4, yellow 6.4.

Example IV 50 kilograms of solid mimosa bark extract are made into a homogeneous liquid by heating with 45 litres of water. A sufficient quantity of bisulphite of soda to provide a weight of pure salt which is 3¼% of the weight of the solid extract is stirred in and the temperature is raised to 95° C. This temperature is maintained and the liquor is constantly stirred whilst formic acid equivalent in pure formic acid to ¾% of the weight of the solid extract is added in three equal instalments spread over a period of one and a half hours. The temperature is maintained and the stirring continued for a further period of one hour, sufficient water being then added to bring the weight of the liquid product up to 100 kilograms.

This extract shows a standard Lovibond tintometer colour-measurement of red 1.2 and yellow 1.8 whereas an extract treated in the same way but without formic acid shows red 1.7 and yellow 2.7.

Example V

Solid mangrove bark extract is treated in the manner described in Example IV, there being the same proportions of extract, bisulphite of soda and formic acid. The resultant extract shows a standard Lovibond tintometer colour-measurement of red 6.8 and yellow 12.0 whereas the same mangrove bark extract treated in a similar manner but without formic acid shows red 9.7 and yellow 22.7.

Example VI 100 kilograms of liquid chestnut-wood extract are treated in the same manner as described in Example IV, there being the same amounts of bisulphite of soda and formic acid as are given for the 50 kilograms of solid mimosa bark extract referred to in this example. The resultant extract shows a standard Lovibond tintometer colour-measurement of red 2.7 and yellow 10.2 whereas the same chestnut-wood extract treated in the same way but without formic acid shows red 3.1 and yellow 11.6.

The marked improvement in colour which is evidenced by the tintometer readings specified in the case of each of the above examples is even more pronounced in leather which is tanned with any one of these treated extracts.

Whilst in all the examples referred to above the sulphurous acid and/or its salts are added to the liquor before the formic acid or the salt thereof, it is to be noted that successful results can be obtained when the formic acid or the salt thereof is added first although the sequence of the steps preferred is that described in the examples.

What we claim as our invention and desire to secure by Letters Patent is:—

1. The method of decolourizing vegetable tanning material, which consists in heating the material in water so as to form a homogeneous liquid, adding sulphurous acid and its salts to the hot liquid, and then adding formic acid and its salts.

2. The method of decolourizing vegetable tanning material, which consists in heating the material in water so as to form a homogeneous liquid, adding at least one salt of sulphurous acid to the hot liquid, and then adding formic acid to the solution in several instalments separated by appreciable time intervals.

3. The method of decolourizing vegetable tanning material, which consists in heating the material in water so as to form a homogeneous liquid, adding at least one salt of sulphurous acid to the hot liquid, and then adding formic acid, the liquid being maintained at a temperature of between 75° C. and about 105° C. in the presence of the formic acid.

4. The method of decolourizing vegetable tanning material, which consists in heating the material in water so as to form a homogeneous liquid, adding at least one salt of sulphurous acid to the hot liquid, and then adding formic acid, the liquid being maintained at a temperature of between 90° C. and 95° C. in the presence of the formic acid.

5. The method of decolourizing vegetable tanning material, which consists in heating the material in water so as to form a homogeneous liquid, adding at least one salt of sulphurous acid to the hot liquid, and then adding to the liquid an amount of formic acid which is less than 2 per cent of the weight of the solid tanning material.

6. The method of decolourizing vegetable tanning material, which consists in heating the material in water so as to form a homogenous liquid, adding salts of sulphurous acid to the hot liquid, and then adding to the liquid an amount of formic acid which is less than 2 per cent of the weight of the tanning material in three or more instalments separated by time intervals of at least thirty minutes, the liquid being maintained at a temperature of between 75° C. and about 105° C. in the presence of the formic acid.

7. The method of decolourizing vegetable tanning material, which consists in heating the material in water so as to form a homogeneous liquid, adding at least one salt of sulphurous acid to the liquid, and adding to the liquid a salt of formic acid.

8. The method of decolourizing vegetable tanning material, which consists in heating the material in water so as to form a homogeneous liquid, adding sulphurous acid to the hot liquid, and then adding formic acid in several instalments separated by appreciable time intervals, the liquid being maintained at a temperature of between 90° C. and 95° C. during the addition of the formic acid.

9. In the decolourization of vegetable tanning materials or extracts in a hot aqueous solution of sulphurous acid and/or the salts of that acid, the step of adding formic acid and its salts to the solution.

10. In the decolourization of vegetable tanning materials or extracts in a hot aqueous solution of sulphurous acid and/or the salts of that acid, the step of adding formic acid to the solution.

11. In the decolourization of vegetable tanning materials or extracts in a hot aqueous solution of sulphurous acid and/or the salts of that acid, the step of adding a salt of formic acid to the solution.

12. In the decolourization of vegetable tanning materials or extracts in a hot aqueous solution of sulphurous acid and/or the salts of that acid, the step of adding formic acid to the solution in several instalments separated by appreciable time intervals, the solution being maintained at a temperature of between 75° C. and about 105° C. during the addition of the formic acid.

13. The method of decolourizing quebracho tanning extract which consists in heating the extract in water so as to form a homogeneous liquid, adding sufficient bisulphite of soda for the pure salt to be equivalent to 7 per cent by weight of the solid extract, maintaining the temperature of the liquid at approximately 95° C., and adding formic acid, equivalent in pure acid to 1.43 per cent by weight of the solid extract, in six instalments spread over a period of about twelve hours.

14. The method of decolourizing quebracho tanning extract which consists in heating the extract in water so as to form a homogeneous liquid, adding sufficient bisulphite of soda for the pure salt to be equivalent to 6 per cent by weight of the solid extract together with an amount of anhydrous sodium formate equivalent to 0.6 per cent of the weight of the solid extract, and then maintaining the liquid at a temperature of about 98° C. for a period of the order of sixteen hours.

15. The method of decolourizing quebracho tanning extract which consists in heating the extract in water so as to form a homogeneous liquid, maintaining the temperature of the liquid at approximately 40° C. and constantly stirring whilst sulphurous acid gas, equal in weight to 2 per cent of the weight of the solid extract, is passed into the liquid, raising the temperature of the liquid to 90° C. and maintaining it at this value, and adding to the liquid formic acid, equivalent in pure acid to ¾ per cent of the weight of the solid extract, in six equal instalments spread over a period of about three hours.

ANDREW TURNBULL.
FREDERICK BENJAMIN HOBSON.